2,893,872
SANDWICH SPREAD AND A PROCESS FOR ITS MANUFACTURE

Roger Gaston Pernot, Dole du Jura, France, assignor to Amil Aliments Modernes Intégraux Lactés X. Rudloff, R. Pernot, P. Berger & Cie, Brazey-en-Plaine, Department of Cote-d'Or, France, a corporation of France No Drawing. Application September 10, 1954
Serial No. 455,351

9 Claims. (Cl. 99—117)

Milk is the raw material of a number of very nutritious foodstuffs. The fat of the milk is utilized in butter. In the production of cheese the protein of milk (casein) and a smaller or larger part of the milk fat is employed. The casein is in this case coagulated by means of rennet or by the lactic acid formed in the milk by a lactic fermentation process or by a combination of these two agents, with the application of heat. The coagulated substance (curd) is more or less separated from the whey by cutting it up; stirring and letting the whey drip off.

When the product has been shaped as required, the cheese is either consumed in the fresh state or is subjected to a maturing process before it is consumed.

The dietetic value of cheese, particularly of the fresh cheeses, mostly produced by the lactic acid process, which are usually spread on the bread, is nowadays generally known and recognized. But many people do not enjoy these products because of their specific smell and taste. Also they do not keep well and are therefore not suitable for instance, as provisions for tourists.

On the other hand, it is also generally accepted nowadays that yeast and its derivatives are some of the most valuable foodstuffs, and can represent one of the best natural sources of vitamins. At the present moment it is employed as dry yeast in the form of tablets, flakes or powder; it is taken in this form or added to drinks or to dishes. Yeast extracts are also known in liquid, pasty or dry forms, and the pasty forms are also used as a sandwich spread. Many of these yeast preparations have the specific taste of yeast, to which many people object.

The object of the present invention is a sandwich spread and a process for its manufacture. It is a characteristic feature of the sandwich spread that it is obtained from a mixture of curd, yeast and special salts, heated in the presence of water.

In the process according to this invention, the curd and the yeast are mixed in a vacuum melting pan and melted in the presence of sufficient water, after the special salts have been added.

This process in accordance with the present invention removes the above-mentioned disadvantages of the milk products and of the yeast preparations but combines their advantages in one product.

The curd employed for these preparations is obtained by acidification, by the application of rennet or by a combination of these two processes. The curd is then treated so that a product containing 45–50% of dry solids is obtained. According to the desired fat content of the finished product, one can use whole milk or partially or completely skimmed milk. The coagulation can be achieved efficiently by adding to the milk heated to 60–70° C. a sufficient quantity of a solution of an organic acid, e.g., 10% citric acid to coagulate the casein.

The addition is made in small successive quantities, and until the clear whey separates. Other acids, such as lactic acid or acetic acid, can be used for the precipitation. The curd is carefully taken out by means of flat perforated spoons and left to drain.

The curd and the yeast, preferably dry yeast in the form of a powder or of flakes, since fresh yeast usually contains too much water, are then mixed according to this invention in a vacuum melting pan as is normally used in the manufacture of processed cheese, with the addition of any further substances. The mixture is then melted after the addition of the special salts and of the required quantity of water. The special salts would be, for instance, a mixture of phosphate and citrate or only phosphate. The phosphates should be preferably polyphosphates, but good results are also obtained with ortho-, meta- and pyrophosphates. As is well known, such salts sequester calcium ions, and thus calcium ions from the calcium compounds of the casein are separated therefrom and are combined with the citrate or phosphate in the final product.

The quality of the sandwich spread is largely determined by the quality of the yeast employed in the mixture. In order to obtain a pleasant taste, this should contain as few autolysed cells as possible, and should be as white as possible, i.e., it should be well washed. In order to maintain a high content of vitamins, a yeast rich in vitamins should be employed. Owing to the high temperature used for the melting process, possibly 90–98° C., the product is pasteurized (in particular, any asporogene germs which may be present in the milk are definitely killed). Although the temperature mentioned above is comparatively high, it has no detrimental effects on the taste of the product. Since the heating is done in containers excluding the oxygen of the air and the mixture has an acid reaction, the vitamins are generally not attacked. In the processing of fat-containing milk it is possible to obtain a product enriched with vitamin D by treating it with ultra-violet rays of a suitable wave length.

In this process it is also possible to replace the animal milkfat by vegetable fats and oils, particularly if the curd has been obtained from skim milk. The following fats and oils of vegetable origin can be employed to enrich the curd with fat: hazel nut oil, olive oil, and especially cold-pressed unrefined olive oil and other vegetable fats and oils. This enriching with fatty substances will be done particularly in order to obtain a food of high dietetic value, because the latest scientific investigations have shown that animal fats have certain disadvantages from a dietetic point of view.

Also other substances, such as nuts, fruits or cereal (the latter for example in the form of flour), can be added.

According to the quantity of water added (between 48 and 60%) a final product of a consistency ranging from firm to honey-like is obtained.

This water content can be adjusted as desired by the addition of water to the mixture which has to be melted. But it has also been found to be advantageous to replace at least some of the water by the whey obtained in the production of the curd, by a mixture of curds and whey or by buttermilk.

The following examples give details on the composition of the initial mixture for the manufacture of a sandwich spread in accordance with the present invention, and also data on the final products which will be obtained.

1st example:

| | | |
|---|---|---|
| Curds obtained from wholemilk (46% dry solids, 56% of these fat) | kg | 10 |
| Dry yeast | kg | 3 |
| Fatty substance (butter or vegetable fat) | kg | 1 |
| Cooking salt (or dietetic salt or spices) | gr | 115 |
| Emulsifier (polyphosphates) | gr | 150 |
| Water | litre | 4.6 or 6.4 | which will give 18.9 or 20.7 kg. of the final product, with 46% or 42% respectively of dry solids. About 40% of the dry solids are fat.

2nd example:

| | | |
|---|---|---|
| Curds from wholemilk (46% dry solids, 56% of these fat) | kg | 10 |
| Wholemilk powder (26% of the dry solids being fat) | kg | 1 |
| Dry yeast | kg | 3 |
| Fatty substance (butter or vegetable fat) | kg | 1.3 |
| Cooking salt (or dietetic salt or spices) | gr | 115 |
| Emulsifier (polyphosphates) | gr | 150 |
| Water | litres | 6 or 8 | which will give 21.5 or 23.5 kg. of the final product, with 46% or 42% respectively of dry solids. About 40% of the dry solids is fat.

A further advantage of the product consists in the fact that it can be sterilised by heating without any detrimental changes in the taste, although this involves a certain loss of vitamins. It will, therefore, become important as a product for export, or as a food for tourists which can be easily assimilated.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. A sandwich spread comprising the product obtained by heating to pasteurizing temperature, in the presence of water an admixture of fresh uncured curds with dry yeast, and with a salt selected from the group consisting of phosphates, citrates and mixtures thereof.

2. A process for the manufacture of a sandwich spread, which comprises mixing fresh uncured curds with dry yeast, and with a salt selected from the class consisting of phosphates, citrates and mixtures thereof, and subjecting said admixtures of curds, yeast and salt to pasteurizing temperature in the presence of water.

3. A process for the manufacture of a palatable sandwich spread, which comprises admixing fresh uncured curds with dry yeast, and with a salt selected from the class selected from the group consisting of phosphates, citrates and mixtures thereof, and subjecting said admixtures of curds, yeast and salt to heating under vacuum, to pasteurizing temperature in the presence of water.

4. A product according to claim 1 in which the salt is a polyphosphate.

5. A process according to claim 2 in which the coagulating acid is citric.

6. A process according to claim 3 in which the curds are made from ultraviolet irradiated whole milk.

7. A process according to claim 3 in which the curds are made from at least partially skimmed milk and at least one vegetable fat is added to the mixture before heating.

8. A process according to claim 3 in which the curds are made from at least partially skimmed milk and at least one vegetable oil is added to the mixture before heating.

9. A process according to claim 3 in which the added salts are polyphosphates.

References Cited in the file of this patent

UNITED STATES PATENTS

| | | |
|---|---|---|
| 65,494 | Livingston | June 4, 1867 |
| 685,664 | Bell | Oct. 29, 1901 |
| 1,220,010 | Schlinck | Mar. 20, 1917 |
| 1,335,383 | McColl et al. | Mar. 30, 1920 |
| 1,572,533 | Heuser | Feb. 9, 1926 |
| 1,590,837 | Liebers | June 29, 1926 |
| 1,676,138 | Epstein | July 3, 1928 |
| 1,708,914 | Dass | Apr. 9, 1929 |
| 2,009,136 | Grelck | July 23, 1935 |
| 2,009,238 | Parsons | July 23, 1935 |
| 2,081,273 | Hoermann et al. | May 25, 1937 |
| 2,224,720 | Butterworth et al. | Dec. 10, 1940 |
| 2,604,405 | Petersen | July 22, 1952 |
| 2,617,730 | Long et al. | Nov. 11, 1952 |

FOREIGN PATENTS

| | | |
|---|---|---|
| 590,617 | France | June 19, 1925 |